Patented Oct. 26, 1926.

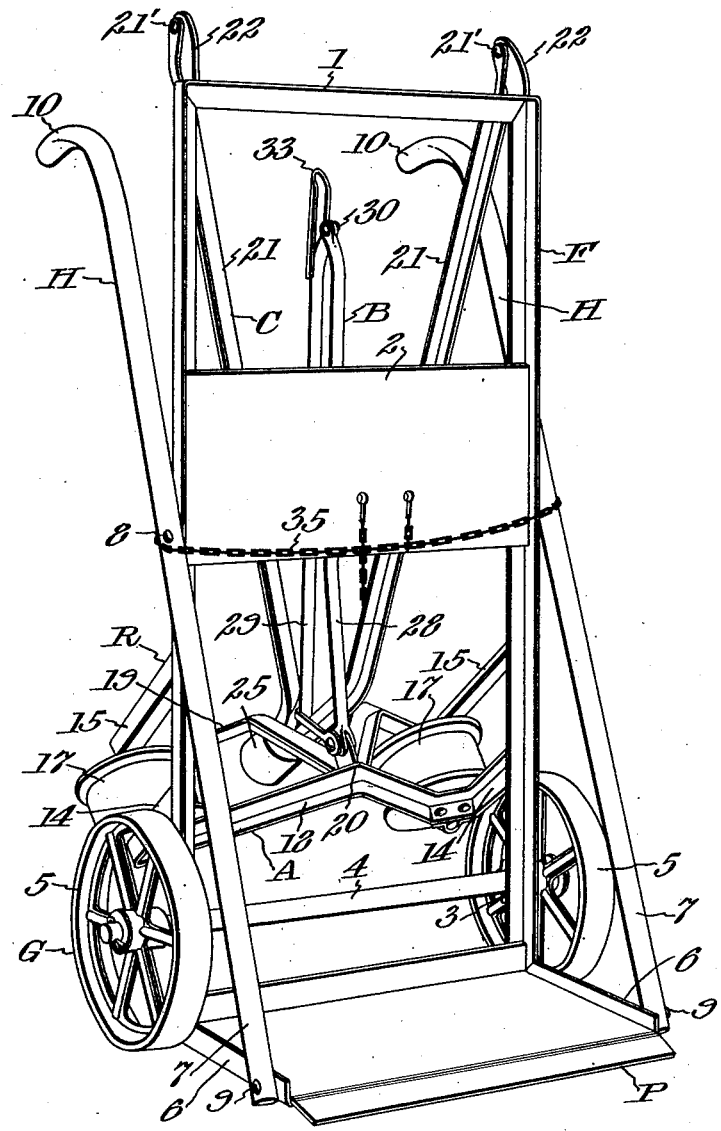

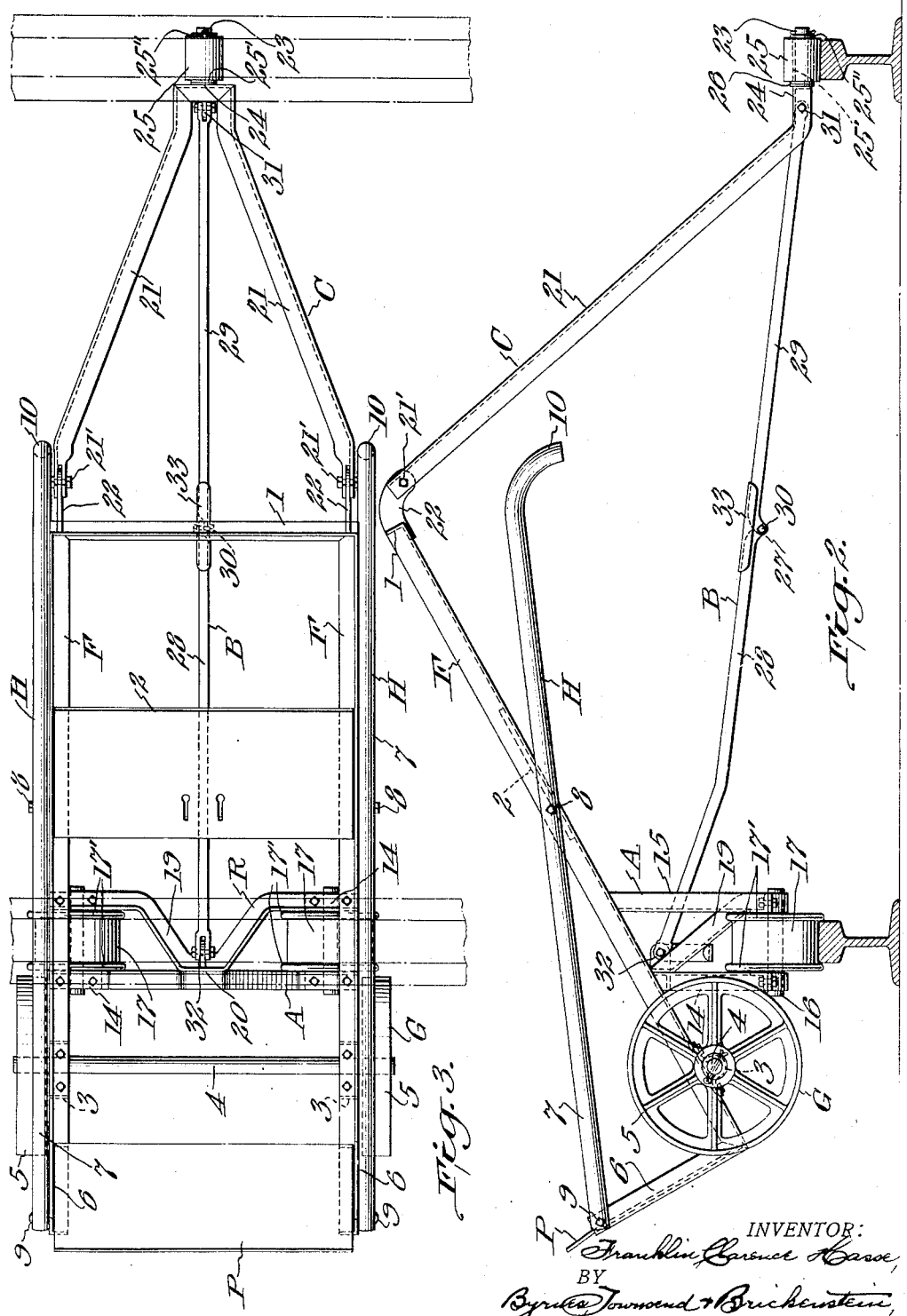

1,604,571

UNITED STATES PATENT OFFICE.

FRANKLIN CLARENCE HASSE, OF LA GRANGE, ILLINOIS, ASSIGNOR TO OXWELD RAILROAD SERVICE COMPANY, A CORPORATION OF DELAWARE.

CONVERTIBLE TRUCK.

Application filed October 15, 1925. Serial No. 62,667.

This invention relates to trucks adapted for use in wheeling heavy articles from place to place, and more particularly to a convertible truck adapted for use either on a railroad track or on a plane surface like the ground.

The principal object of the present invention is to provide a truck adapted for use in conveying gas-containing cylinders or other articles along a railroad track or along a warehouse floor, the ground or other relatively plane surfaces.

Another object of the invention is to so construct the truck that none of the track electrical devices shall be operated when it is used on a railroad having such devices.

Other features and advantages of the invention will be made clear by a description of a preferred embodiment thereof that is illustrated in the accompanying drawings, in which:

Fig. 1 is a view of an embodiment of the present invention, in position to be wheeled along a floor; and Figs. 2 and 3 are, respectively, elevation and plan views of the truck shown in Fig. 1, positioned on a railroad track.

Generally speaking, the convertible truck comprises a frame F having a tank or article-carrying platform P at the lower end thereof, a ground carriage G as well as a rail carriage R secured to said frame, and a pair of handles H for pushing the truck over the ground.

The frame F may be constructed in any desirable manner, and is here shown as consisting of a rectangle 1 built up either of a single length or several lengths of angle iron and a sheet metal plate 2 transverse to said frame providing a supporting back for tanks or other articles carried on the platform P.

A pair of bearings 3 secured to the rear of the said frame adjacent the lower end thereof provide journals for an axle 4, which has a wheel 5 rotatably mounted at each end thereof outside the rectangle 1, whereby the truck is adapted to be wheeled about in the usual manner. The rectangle 1, the plate 2, platform P, and other parts of the truck may be welded together or united by riveting or otherwise.

The tank platform P is mounted on and desirably welded to a pair of side supports 6 integral with and projecting forwardly from the lower end of the rectangular frame. The rear of said platform may also be welded directly to the bottom angle iron of the frame. In order to brace the frame 1, the side supports 6 and the platform, a pipe 7 is secured, or may be welded, on each side to the frame, as at 8, and near the forward end of each support, as at 9. Each pipe 7 projects angularly rearwardly and upwardly from the frame, and terminates in a curved end 10, to provide a pair of handles for the truck. The platform is disposed at an angle to the plane of the frame and so arranged that it will normally rest close to or upon a floor to receive or discharge a load, after which it may be raised by swinging the handles rearwardly and downwardly about the axle 4 in the usual manner.

The rail carriage R comprises a wheel-supporting frame A rigidly mounted on the rear side of the frame 1 a short distance above the bearings 3, a foldable roller-supporting frame C hinged adjacent the upper end of the frame 1, and a foldable brace B hinged to the free end of the frame C and to the frame A inside the frame 1. The fixed frame A may consist of a pair of hangers 14, 15 depending at an angle from each side of the rear of frame 1. Pairs of bearings in these hangers support axles 16 in planes perpendicular to the plane of the axle 4. The axles 16 carry a pair of alined wheels 17, shaped and having spaced flanges 17' to fit the head of the usual railroad rail. Angle iron cross braces 18 and 19 respectively connect the hangers 14 and 15, and are united midway between the pairs of hangers, as at 20.

The foldable frame C comprises a V-frame formed of angle irons 21 which are rotatably secured by bolts 21' to a pair of tongues 22 projecting from the upper ends of the frame 1. This V-frame has a shaft 23 mounted in and projecting from its apex end 24, upon which is journalled a roller or a wheel 25 that is insulated from the shaft 24 by a bushing 25' and a washer 25", which bushing and washer may be made of any suitable insulating material as lignum vitæ. When the frame C is unfolded, the roller engages the other rail to support one side of the truck for movement along the rails. The insulation prevents the truck from operating the track electrical devices when standing or rolling on the rails.

A folding brace B is provided for the purpose of holding the wheel 25 in its operative position and prevents the collapsing of the V-frame carrying it. This brace consists of two bars 28 and 29 hinged together by a bolt 30, and hinged to the V-frame and to the main frame 1 by bolts 31 and 32 at their other ends. The bolt 32 is secured to the cross braces at 20, and the bolt 31 to the apex 24 of the V-frame. A guard 33 is welded to the upper side of bar 28 and engages the upper side of bar 29, when the frames A and B are opened, to keep the bars 28, 29 from collapsing downwardly, making in effect a rigid brace of the bars 28, 29. Suitable means, such as a chain 35 may be provided to secure cylinders or other load in place on the truck.

The operation of the convertible truck is obvious from the foregoing description. While the truck is used for ground transportation, the parts carrying the roller 25 are collapsed out of the way, the foldable brace, the V-frame, and the wheel 25 being folded directly behind the frame F into an unobstructive position. If the truck is to be used on a railroad track, it is wheeled into place alongside a rail with the axle 4 parallel to the rail. The V-frame may then be pulled out rearwardly and braced in position so that wheel 25 is on a line with the lower faces of wheels 17, whereupon the entire truck may be tilted rearwardly about the axle 4 until the wheels 17 engage the rail. Further tilting of the truck about the axles 16 moves the wheels 12 and 25 into full engagement with and upon the rails to properly support the truck and its load on the rails. The tanks or other load on the truck have an inclined position and may be positioned so as to exert little or no unbalancing effect when the truck is transported along the rails, the three track wheels providing a stable support. It is thus evident that the truck may be readily collapsed and converted into a two-wheel portable truck off the track, or unfolded and converted into a track truck.

It will be understood that the improved means whereby the truck is adapted for transportation along track rails is in the nature of an attachable carriage for the usual hand truck to convert the latter into a track truck. While a preferred construction is herein illustrated and described, it is to be understood that changes may be made in various portions without departing from the scope and spirit of the invention.

I claim:

1. A truck comprising a frame, conveying wheels connected to said frame adjacent one end thereof, a platform mounted on said frame and arranged so that it may be positioned close to a floor or the ground to receive and discharge a load thereon, and other conveying wheels connected to said frame and adapted to carry said frame, platform and first-mentioned wheels.

2. A truck comprising a frame, a platform secured to said frame and disposed at an angle to the plane thereof, conveying wheels connected to said frame adjacent one end thereof, and other conveying wheels connected to said frame and adapted to carry said frame, platform and first-mentioned wheels.

3. A convertible hand and track truck comprising in combination a frame having article-carrying means thereon, ground wheels adapted to support said frame for ground transportation, and means comprising foldable devices whereby said truck is convertible for transportation along railroad rails.

4. A convertible hand and track truck comprising a frame having article-supporting means thereon; wheel means connected to said frame and adapted to support said truck for transportation along a plane surface, such as a floor; wheel means connected to said frame and adapted to support said truck for transportation along a fixed track; and means to prevent the operation of track electrical devices by said truck while it is on said track.

5. A convertible hand and track truck comprising a main frame having article-supporting means and a handle; wheels adapted to support said truck for transportation along a plane surface, such as a floor or the ground; and means whereby said truck may be supported for transportation along a pair of rails comprising wheel means mounted on said main frame and adapted to engage and roll along one of said rails, a frame hinged to said main frame, and wheel means on such hinged frame adapted to engage and roll along the other rail.

6. A combined hand and track truck comprising in combination a frame having an article-carrying platform at the lower end thereof, wheels mounted on said frame for supporting the latter for ground transportation, and means comprising a fixed member having two wheels mounted thereon and a foldable member having an insulated wheel secured thereto whereby said frame may be mounted for transportation along a railroad track.

7. A combined hand and track truck comprising in combination a frame having an article-carrying platform thereon, ground wheels adapted to support said frame for ground transportation, handle means secured to said frame for moving the said truck, and a rail carriage secured to said frame whereby said truck may be mounted for transportation along a railroad track, said rail carriage comprising a fixed member carrying two flanged wheels secured to said frame behind said ground wheels so that the truck may easily be positioned on the railroad track, and a foldable member carrying an insulated wheel rotatably secured to said frame adapted to cooperate with said flanged wheels for rail transportation and to collapse into an unobstructive position for ground transportation.

8. An attachment for a wheeled hand truck comprising a collapsible rail carriage adapted to be so secured to said truck that the latter may be carried upon and along railroad rails but out of contact with such rails.

9. An attachment for a two-wheeled hand truck comprising a rail carriage adapted to be secured to said truck whereby the latter may be used for transportation along and upon railroad rails, said carriage consisting of a rigid member and a foldable member.

10. An attachment for a two-wheeled hand truck comprising a rail carriage adapted to be secured to said truck whereby the latter may be used for transportation along a railroad track, said carriage consisting of a rigid member carrying two flanged wheels and a foldable member carrying an insulated wheel at the end thereof.

11. A truck comprising a frame, a platform secured to and projecting forwardly of the lower end of said frame, an axle carried by said frame above said platform, wheels mounted on said axle for transporting said truck, and handle bars secured intermediate their ends to said frame, said handle bars projecting behind and in front of said frame and secured at their forward ends to brace said platform.

12. A convertible hand and track truck comprising a main frame having a platform at its lower end, handles secured to said frame and bracing said platform, a main axle mounted on said frame above said platform, wheels on said axle for transporting said truck along a plane surface, a frame hinged adjacent the upper end of said frame, a wheel carried by but insulated from such hinged frame, means for bracing said hinged frame when it is unfolded, a pair of parallel axles perpendicular to a plane through said main axle, and wheels on said pair of axles.

13. The combination with a hand truck having wheels, of a collapsible rail carriage so secured to said truck that the latter may be rolled on said wheels when said carriage is collapsed and may be supported upon but out of contact with rails when said carriage is adjusted to engage such rails.

14. The combination with a hand truck having wheels and also having members provided with handles, of a collapsible rail carriage secured to said members and constructed and arranged so that said truck may be rolled on said wheels when said carriage is collapsed and may be lifted off said wheels and transported bodily along railroad rails when said carriage is adjusted to engage such rails.

In testimony whereof, I affix my signature.

FRANKLIN CLARENCE HASSE.